(12) United States Patent
Helgerson et al.

(10) Patent No.: US 7,503,450 B2
(45) Date of Patent: Mar. 17, 2009

(54) LONG ROLLER SLIP CONVEYOR

(75) Inventors: David E. Helgerson, Plymouth, MN (US); Steven A. Jensen, Norwood-Young America, MN (US); Joshua D. Krause, Maple Grove, MN (US); Brian D. Koenig, Hastings, MN (US); Robert J. Robinson, State College, PA (US)

(73) Assignee: MagStar Technologies, Inc., Hopkins, MN (US)

( * ) Notice: Subject to any disclaimer, the term of this patent is extended or adjusted under 35 U.S.C. 154(b) by 10 days.

(21) Appl. No.: 11/891,703

(22) Filed: Aug. 13, 2007

(65) Prior Publication Data

US 2009/0045035 A1    Feb. 19, 2009

(51) Int. Cl.
*B65G 13/06* (2006.01)
(52) U.S. Cl. .............................. 198/781.04; 198/781.02; 193/37
(58) Field of Classification Search ............ 198/781.02, 198/781.03, 781.04; 193/35 R, 37
See application file for complete search history.

(56) References Cited

U.S. PATENT DOCUMENTS

| | | | | |
|---|---|---|---|---|
| 3,066,788 A * | 12/1962 | Christiansen | .......... | 198/781.08 |
| 4,066,815 A * | 1/1978 | Olink et al. | .................. | 428/336 |
| 4,143,525 A * | 3/1979 | Major | .................... | 198/781.02 |
| 4,844,231 A * | 7/1989 | Usui | ........................ | 198/345.3 |
| 4,993,541 A * | 2/1991 | Roh | ........................ | 198/781.02 |
| 5,161,673 A * | 11/1992 | Cairns | .................... | 198/781.04 |
| 5,558,205 A | 9/1996 | Helgerson et al. | | |
| 5,558,206 A | 9/1996 | Helgerson et al. | | |
| 6,053,298 A * | 4/2000 | Nimmo et al. | ................. | 193/37 |
| 6,471,043 B2 * | 10/2002 | Schwingshandl et al. | ....................... | 198/781.06 |
| 6,516,940 B1 * | 2/2003 | Hart et al. | ................. | 198/781.1 |
| 6,722,493 B2 * | 4/2004 | Matsuoka et al. | ........... | 198/788 |
| 6,782,996 B1 * | 8/2004 | Wolf | ..................... | 198/781.02 |
| 6,959,804 B2 * | 11/2005 | Helgerson et al. | ........... | 198/805 |
| 7,028,825 B2 * | 4/2006 | Scott | ........................... | 193/37 |
| 7,398,874 B2 * | 7/2008 | Deur | .......................... | 198/780 |

* cited by examiner

*Primary Examiner*—Douglas A Hess
(74) *Attorney, Agent, or Firm*—Nikolai & Mersereau, P.A.; Thomas J. Nikolai

(57) ABSTRACT

A slip roller conveyor has a frame comprising a pair of parallel, spaced-apart side plates. Secured to each of the side plates is a plurality of annular rollers with a predetermined pitch distance between adjacent rollers. The annular rollers have tubular sleeves of a lesser diameter projecting outward from a side surface thereof. The tubular sleeves on an opposed pair of annular rollers fit into the lumen of a longer tubular roller with a clearance fit. The annular rollers on each of the side plates are driven by an endless belt that also surrounds a motor-driven nose roller.

7 Claims, 3 Drawing Sheets

LONG ROLLER SLIP CONVEYOR

BACKGROUND OF THE INVENTION

I. Field of the Invention

This invention relates generally to roller conveyors for carrying articles from a first location to a second location, and more particularly to slip roller conveyors with elongated rollers adapted to carry articles of a non-planar shape and without the need for a flat pallet to support the irregular-shaped articles during transport.

II. Discussion of the Prior Art

Many forms of conveyors are known in the art for moving articles along a production line from a first point to a second point. For example, prior art conveyors commonly comprise a frame having a pair of side rails held in parallel, spaced-apart relation and supporting a plurality of cylindrical rollers that are journaled for rotation between the side rails. If the conveyor is inclined to the horizontal, gravity may cause the conveyed products to move when the force of gravity exceeds the frictional resistance of the bearings used to journal the rollers. Alternatively, the rollers may be driven by an electric motor through a chain or belt that is made to engage the rollers.

One problem with positive drive roller conveyors of the prior art is that they can mar the article being transported in those instances where articles become backlogged on the conveyor because a product in-feed rate exceeds the rate at which the articles are removed from the conveyor.

One solution to this problem is afforded by my earlier U.S. Pat. Nos. 5,558,205 and 5,558,206, the teachings of which are hereby incorporated by reference. The conveyors described in those patents include rollers mounted on the opposed side rails that include a first roller element that is positively driven and that includes a stub shaft extending from a side surface of that first roller element. A second roller element is mounted in surrounding relation to the stub shaft of the first roller element with a clearance fit. The first roller element of the roller assemblies that is affixed to one of the rails is driven by a motor through an elongated, endless, toothed, timing belt. Rectangular pallets span the space between the second roller elements on each of the side rails and carry the product being conveyed. With this arrangement, the weight of the pallet plus the article being transported results in frictional engagement between the second roller element and the stub shafts on the first roller elements to move the pallets and products along the conveyor at a rate determined by the motor drive arrangement. However, in the event of a backlog condition, there is not enough friction between the first and second roller elements to move the backlogged products and the stub shafts of the first roller elements slip inside the second roller elements. Thus, the endless belt can continue to drive the first roller elements, but the second roller elements remain stationary until the backlog condition no longer prevails.

Slip roller conveyors of the type described and claimed in my earlier U.S. Pat. No. 5,558,206 are well suited for use in the electronics industry for transporting printed circuit boards along a desired path as pick-and-place robots are used to assemble electronic components on to the printed circuit boards. The conveyor would be designed such that the spacing between pairs of slip rollers affixed to the opposed side rails are generally equal to the width dimension of the printed circuit boards to be transported. The printed circuit boards, themselves being planar, ride smoothly on the slip rollers. However, for non-planar articles, it becomes necessary to place them on generally planar pallets which, themselves, are made to span the width dimension between roller pairs on the opposed side rails of the conveyor frame. This adds processing steps in that the empty pallets leaving the terminal end of the conveyor must be carried back to the conveyor's input end for reuse.

From what has been described, then, persons skilled in the art will appreciate that a need exists for a slip roller conveyor that can be used to transport irregularly-shaped articles but that do not require the use of planar pallets. The present invention fulfills that need.

SUMMARY OF INVENTION

The present invention provides a slip roller conveyor module that comprises a frame including a pair of parallel, spaced-apart side plates that extend a length dimension of the conveyor module. A plurality of slip rollers extend between the side plates in parallel, spaced-apart relation to one another, where each slip roller comprises a pair of annular pulleys, each of a first outer diameter and each with a concentric, tubular sleeve projecting outward from one side surface of the pulleys, the sleeves having a second outer diameter that is less than the first outer diameter. Axle members extend individually through the tubular sleeves and the annular pulleys and are affixed to the side plates. Each of the axle members has a head thereon that abuts a free end of the tubular sleeves. The plurality of slip rollers also include a tubular roller that extends between an opposed pair of annular pulleys that are rotationally secured on the pair of side plates by the axle members. The tubular rollers have an internal diameter for surrounding the tubular sleeves of the pair of annular pulleys such that there is a predetermined clearance fit between the two. A first endless belt engages all of the pulleys affixed to one of the pair of the side plates and a second endless belt engages all of the pulleys affixed to the other of the pair of the side plates. Means are provided for driving the first and second endless belts at the same speed and in the same direction.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
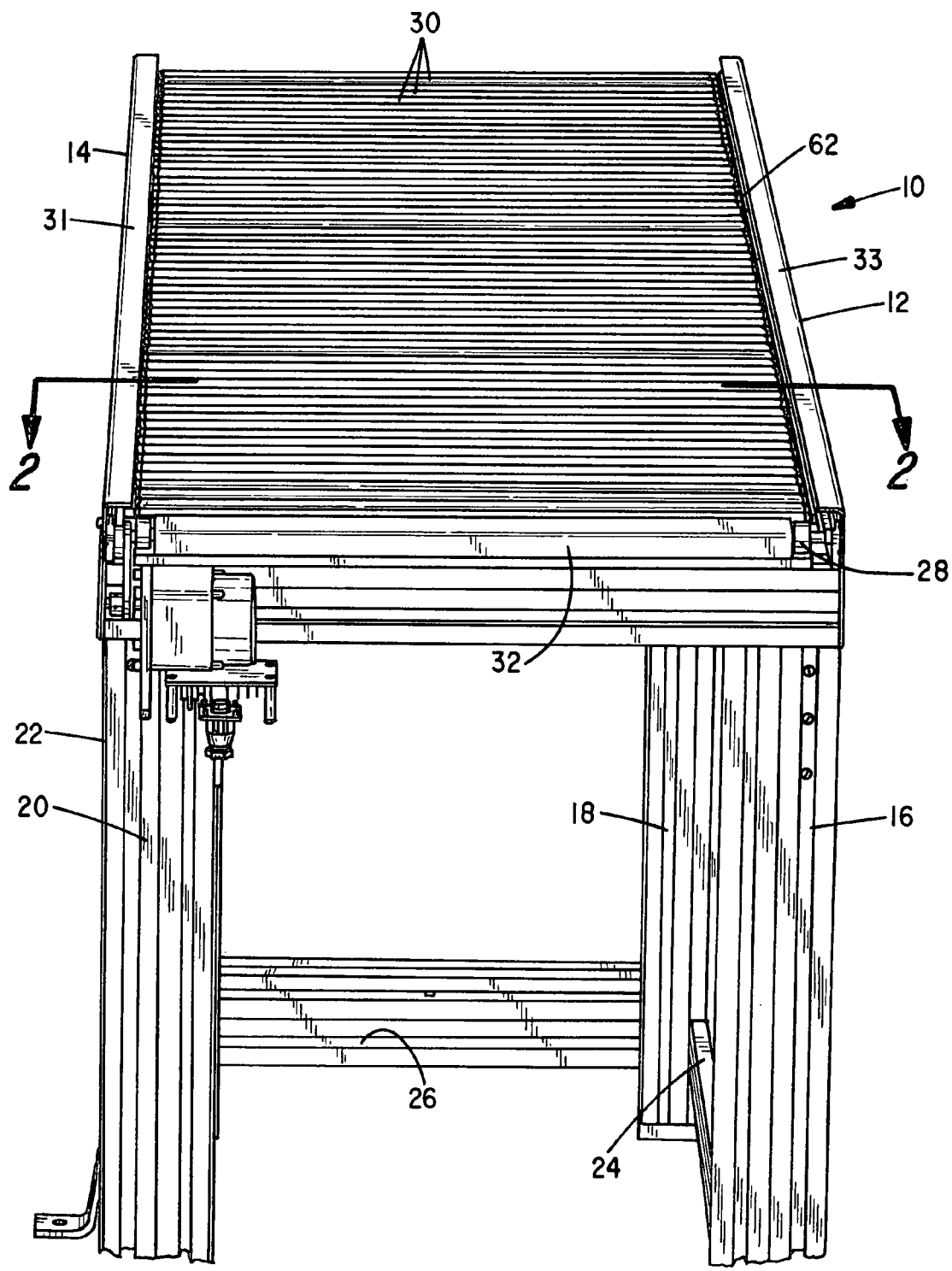
FIG. 1 is a perspective view of a conveyor module constructed in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is indicated generally by numeral 10 a long roller slip conveyor constructed in accordance with the present invention. It is seen to comprise a frame including a pair of side rails 12, 14 that are supported at a desired height by perpendicularly extending legs 16, 18, 20 and 22. To add stability, struts as at 24, 26 are joined to the legs proximate the lower ends thereof to hold the legs in registration proximate the four corners of the module 10.

Extending between the opposed side rails 12 and 14 and journaled for rotation therebetween are a driven nose roller 28 and a plurality of slip rollers as at 30. The nose roller 28 is partially obscured by an elongated guard member 32 while the opposed ends of the slip rollers are obscured by belt guards 31 and 33.

Figure 2:
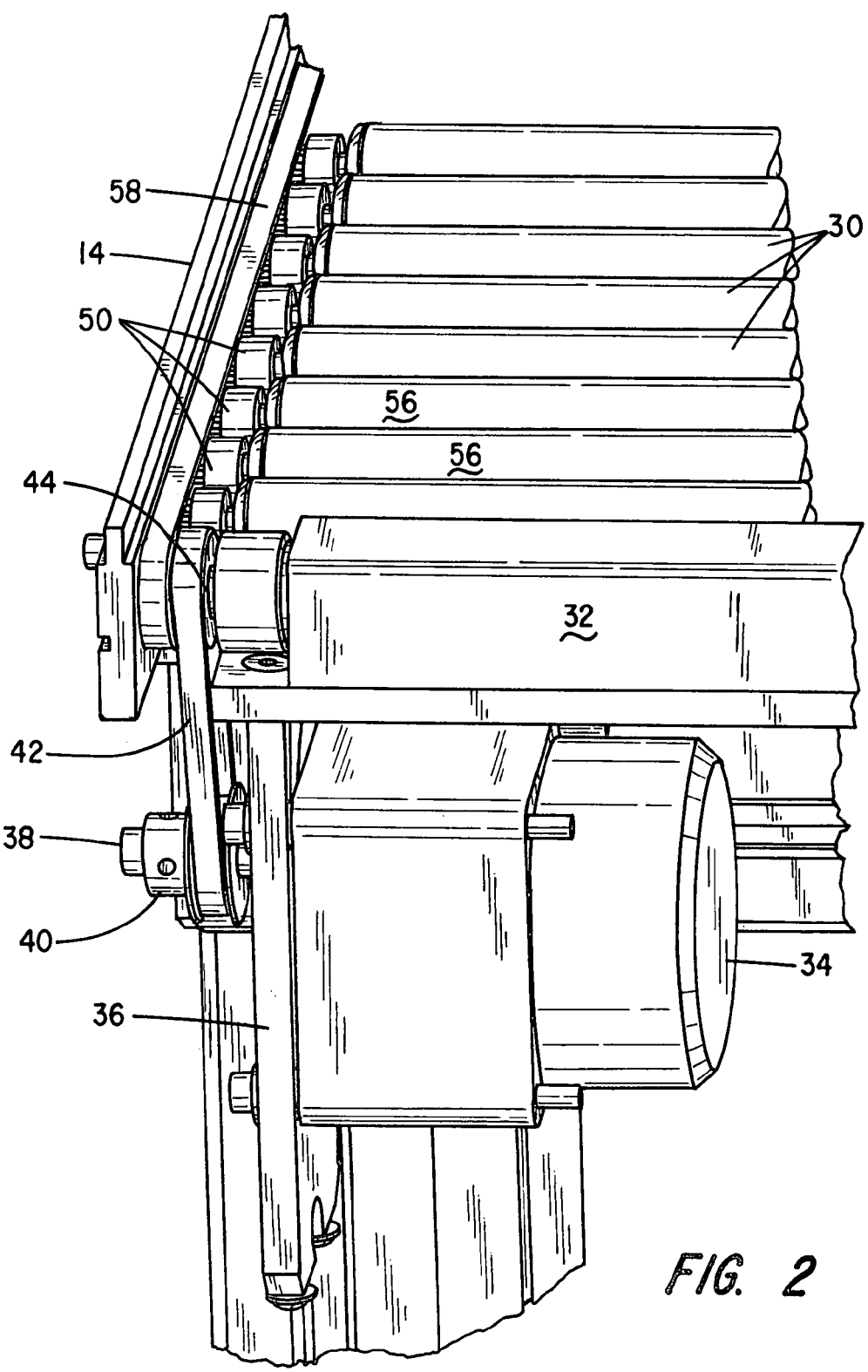
FIG. 2 is an enlarged partial view of the conveyor module of FIG. 1.

Referring momentarily to FIG. 2, it shows the conveyor module 10 with the belt guards 31 and 33 removed. An electric motor 34 is mounted to the frame by a mounting plate 36. The output shaft 38 of the motor carries a sheave 40 and a relatively short endless belt 42 couples the sheave 40 to a pulley 44 affixed to the nose roller 28 for driving same.

Figure 3:
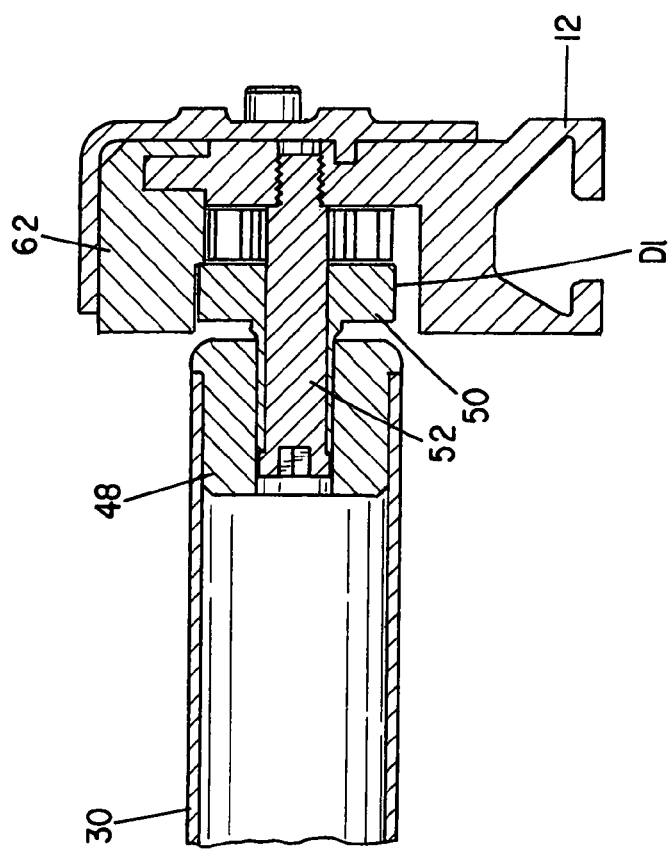
FIG. 3 is a cross-sectional view taken along the line 2-2 in FIG. 1.
Figure 3:
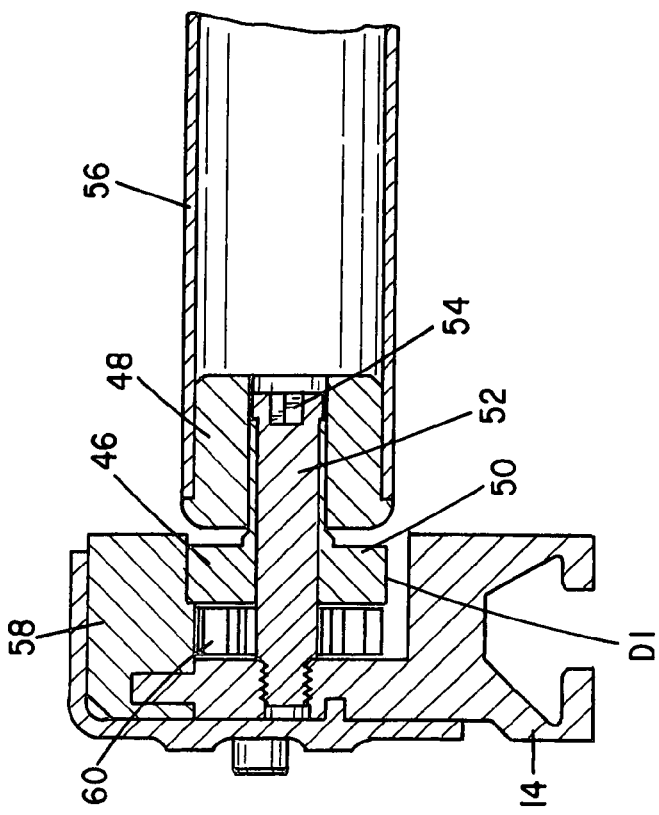

FIG. 3 is a cross-sectional view taken through one of the slip rollers 30. The slip rollers 30 extend between the side plates 12 and 14 in parallel, spaced-apart relation to one another and each includes a pair of annular pulleys 46. These pulleys each have a first outer diameter $D_1$ and each has a concentric tubular sleeve portion 48 integrally formed therewith and projecting outwardly from a side surface 50 of the pulley 46. Axle members, preferably shoulder bolts 52, extend through the tubular sleeves 48 and through the annular pulleys 46 and are secured to the side plates 12 and 14. The shoulder bolts each have a head 54 that is of a larger diameter than the inside diameter of the tubular sleeve 48 and the smooth, non-threaded portion of the shoulder bolt functions as an axle on which the pulleys 46 may spin.

Extending between each of the opposed pairs of pulleys 46 that are aligned across the width dimension of the conveyor bed and surrounding the tubular sleeves 48 of the pulleys is a relatively long tubular roller 56. The inside diameter of the tubular roller 56 is slightly larger than the outside diameter of the tubular sleeves 48 and, as such, there is a clearance fit between the mating surfaces of the sleeves 48 and the tubular roller 56. The heads 54 of the shoulder bolt axle members 52 are of a lesser size than the inside diameter of the tubular roller 56 so as not to interfere with the free rotation thereof on the outer diameter of the tubular sleeves 48.

Referring again to FIG. 2, there is shown a relatively long endless belt 58, which is preferably a timing belt having teeth for engaging cogs or teeth 60 on the surface of the pulleys 46. The belt 58 also spans a sprocket wheel on the left end of the shaft of the nose roller 28 so that as the nose roller is driven by the motor 34, the timing belt 58 is also driven to drive each of the annular pulleys 46 on the plurality of slip rollers 30. A further timing belt 62 spans a sprocket pulley on the right end of the nose roller 28 illustrated in FIG. 1 and this timing belt also engages the teeth on each of the annular pulleys 46 that are rotatably attached to the conveyor's right side rail 12. By using two timing belts 58 and 62 driven by the common nose roller, each end of the slip roller assemblies 30 is driven at the same speed and in the same direction.

Without limitation, the conveyor module 10 may be about 5 feet in length and the side plates 10 and 12 may be spaced to accommodate tubular rollers 56 of different lengths, such as 6 inches, 12 inches and 18 inches. The rollers 56 may have an outside diameter in a range from about ⅞ inch to 1¾ inch and may be spaced from one another with a 1 inch pitch or a 2-inch pitch to accommodate the larger diameter roller. It has been found that by maintaining a clearance fit of from 0.005 to 0.015 inch between the I.D. of the tubular roller 56 and the O.D. of the tubular sleeves 48, irregular, non-planar packages may be readily transported while still maintaining the advantages of a slip conveyor should a backlog condition develop. That is to say, in the event of a backlog, the slip rollers engaged by the product will cease to rotate which prevents scuffing of the product. Furthermore, product shingling does not occur as it sometimes does with conventional, positively driven roller conveyors.

The performance of the slip conveyor is affected by a number of factors including, but not limited to, the mass of the product being conveyed, the coefficient of friction between the material being conveyed and the roller material and the clearance fit for the pulley/roller interface.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A slip roller conveyor module comprising:
   (a) a frame including a pair of parallel, spaced-apart side plates extending a length dimension of said module;
   (b) a plurality of slip rollers extending between the side plates in parallel, spaced-apart relation to one another, each of the slip rollers comprising
      (i) a pair of annular pulleys, each of a first outer diameter and each with a concentric tubular sleeve projecting outward from one side surface of said pulleys, said sleeves having a second outer diameter that is less than the first outer diameter;
      (ii) a pair of axle members extending individually through the tubular sleeves and the annular pulleys and affixed to said side plates;
      (iii) a tubular roller extending between an opposed pair of annular pulleys rotationally secured on the pair of side plates by the axle members and having an internal diameter for surrounding the tubular sleeves thereof with a predetermined clearance fit there between;
   (c) a first endless belt for engaging the pulleys affixed to the first of said pair of side plates and a second endless belt for engaging the pulleys affixed to the second of said pair of side plates; and
   (d) means for driving said first and second endless belts at the same speed and in the same direction.

2. The slip roller conveyor as in claim 1 wherein the means for driving comprises:
   (a) a motor mounted to the frame; and
   (b) a nose roller journaled for rotation between said side plates, the nose roller including a pair of spaced-apart pulleys that engages the first and second endless belts and a further pulley driven by the motor.

3. The slip roller conveyor as in claim 1 wherein the endless belts are timing belts and the pair of annular pulleys each comprises sprockets with teeth for engaging the timing belts.

4. The slip roller conveyor as in claim 2 wherein the spaced-apart pulleys on the nose roller comprise sprockets with teeth for engaging the timing belts and the further pulley driven by the motor is also a sprocket having teeth for engaging a toothed belt coupling the motor to the further pulley on the nose roller.

5. The slip roller conveyor as in claim 1 wherein said axles comprise shoulder bolts screwed into threaded apertures in the side plates and the heads of the which engage free ends of the tubular sleeves.

6. The slip roller conveyor as in claim 1 wherein said predetermined clearance fit is in a range from about 0.005 inch to about 0.015 inch.

7. The slip roller conveyor as in claim 6 wherein the tubular roller has an outer diameter in a range from about ⅞ inch to 1¾ inch and are spaced apart equally on about 1" to 2" centers along the length dimension of the module.

* * * * *